(12) United States Patent
Bennette et al.

(10) Patent No.: US 11,438,978 B2
(45) Date of Patent: Sep. 6, 2022

(54) SYSTEMS, DEVICES, AND METHODS FOR DISPLAYING OPERATIONAL PARAMETERS OF A LIGHT FIXTURE INCLUDING NARROW BAND EMITTERS

(71) Applicant: Electronic Theatre Controls, Inc., Middleton, WI (US)

(72) Inventors: Adam Bennette, London (GB); Anders Ekvall, Middleton, WI (US)

(73) Assignee: Electronics Theatre Controls, Inc., Middleton, WI (US)

( * ) Notice: Subject to any disclaimer, the term of this patent is extended or adjusted under 35 U.S.C. 154(b) by 76 days.

(21) Appl. No.: 16/832,504

(22) Filed: Mar. 27, 2020

(65) Prior Publication Data

US 2020/0314982 A1     Oct. 1, 2020

Related U.S. Application Data

(60) Provisional application No. 62/829,859, filed on Apr. 5, 2019, provisional application No. 62/826,449, filed on
(Continued)

(51) Int. Cl.
*H05B 45/10*     (2020.01)
*H04N 5/235*     (2006.01)
(Continued)

(52) U.S. Cl.
CPC ............. *H05B 45/10* (2020.01); *A01G 7/045* (2013.01); *F21S 10/06* (2013.01); *G06F 3/0482* (2013.01);
(Continued)

(58) Field of Classification Search
CPC ...... H05B 45/10; H05B 45/335; H05B 45/22; H05B 45/325; H05B 45/20; H05B 47/16;
(Continued)

(56) References Cited

U.S. PATENT DOCUMENTS 9,504,134 B2 * 11/2016 Aliakseyeu ............ H05B 45/20
10,552,002 B1 * 2/2020 Maclean ................ G06N 20/00
(Continued)

OTHER PUBLICATIONS

International Search Report with Written Opinion for related Application No. PCT/US2020/025265 dated Aug. 6, 2020 (15 pages).

*Primary Examiner* — Jason Crawford
(74) *Attorney, Agent, or Firm* — Michael Best & Friedrich LLP

(57) ABSTRACT

Systems, devices, and methods for determining and displaying operational parameters of a light fixture that includes narrow band emitters. A controller includes stored information related to spectral power distributions of each of a plurality light wavebands generated by a plurality of narrow band emitters (e.g., LEDs). Based on the spectral power distributions, the controller is configured to determine an output spectrum of the light fixture and/or an output spectrum of individual wavebands. The controller is configured to generate an output display that includes the determined operational parameters associated with the light fixture and a mechanism for manipulating the outputs of the light fixture's wavebands. Using the mechanism, a user can manipulate the operational parameters of the light fixture and observe from the output display a substantially real-time representation of the operational parameters of the light fixture based on the user manipulations.

20 Claims, 4 Drawing Sheets

Related U.S. Application Data on Mar. 29, 2019, provisional application No. 62/826,445, filed on Mar. 29, 2019, provisional application No. 62/826,434, filed on Mar. 29, 2019.

(51) Int. Cl.

| | |
|---|---|
| *G06F 3/0482* | (2013.01) |
| *G06F 3/04847* | (2022.01) |
| *G06F 3/14* | (2006.01) |
| *A01G 7/04* | (2006.01) |
| *H05B 45/325* | (2020.01) |
| *H04N 5/225* | (2006.01) |
| *H05B 45/22* | (2020.01) |
| *H05B 47/16* | (2020.01) |
| *H05B 45/335* | (2020.01) |
| *F21S 10/06* | (2006.01) |
| *F21W 131/109* | (2006.01) |

(52) U.S. Cl.
CPC .......... *G06F 3/04847* (2013.01); *G06F 3/14* (2013.01); *H04N 5/2256* (2013.01); *H04N 5/2351* (2013.01); *H04N 5/2354* (2013.01); *H05B 45/22* (2020.01); *H05B 45/325* (2020.01); *H05B 45/335* (2020.01); *H05B 47/16* (2020.01); *F21W 2131/109* (2013.01)

(58) Field of Classification Search
CPC ........ H05B 45/12; H05B 45/30; H05B 47/10; H05B 47/105; H05B 47/11; H05B 47/155; H05B 47/165; H04N 5/2256; H04N 5/2351; H04N 5/2354; G06F 3/0482; G06F 3/04847; G06F 3/14; G06F 3/048; G06F 3/04815; G01J 3/10; G01J 3/2803; G01J 3/36; G01J 3/32; G01J 3/42; F21S 10/06; A01G 7/045; F21W 2131/109; Y02P 60/14; Y02B 20/40; G01N 21/6486

See application file for complete search history.

(56) References Cited

U.S. PATENT DOCUMENTS

| | | | |
|---|---|---|---|
| 11,301,315 B2* | 4/2022 | Bi ...................... | G06F 11/30 |
| 2006/0012987 A9* | 1/2006 | Ducharme ............ | H05B 45/00 |
| | | | 362/231 |
| 2007/0258240 A1* | 11/2007 | Ducharme ............ | H05B 45/20 |
| | | | 362/231 |
| 2011/0127930 A1* | 6/2011 | Bennette ............... | H05B 45/20 |
| | | | 315/312 |
| 2012/0176042 A1* | 7/2012 | Hatley .................. | H05B 45/20 |
| | | | 315/152 |
| 2013/0328500 A1 | 12/2013 | Toda | |
| 2015/0289328 A1* | 10/2015 | Conrad ................. | H05B 47/11 |
| | | | 315/152 |
| 2016/0259540 A1* | 9/2016 | Hole .................... | G06F 3/0483 |
| 2016/0262239 A1* | 9/2016 | Hole .................... | H05B 47/155 |
| 2017/0013692 A1* | 1/2017 | Bewick ................ | H05B 45/20 |
| 2019/0259108 A1* | 8/2019 | Bongartz .............. | A01G 7/045 |
| 2020/0314982 A1* | 10/2020 | Bennette .............. | H04N 5/2354 |

\* cited by examiner

SYSTEMS, DEVICES, AND METHODS FOR DISPLAYING OPERATIONAL PARAMETERS OF A LIGHT FIXTURE INCLUDING NARROW BAND EMITTERS

RELATED APPLICATIONS

This application claims the benefit of U.S. Provisional Patent Application No. 62/826,434, filed Mar. 29, 2019, U.S. Provisional Patent Application No. 62/826,445, filed Mar. 29, 2019, U.S. Provisional Patent Application No. 62/826,449, filed Mar. 29, 2019, and U.S. Provisional Patent Application No. 62/829,859, filed, Apr. 5, 2019, the entire contents of each of which is hereby incorporated by reference.

FIELD

Embodiments described herein relate to light fixtures including narrow band emitters.

SUMMARY

Conventional lighting systems including one or more light fixtures rely upon devices such as spectrometers or radiometers to measure a spectrum of light emitted from the light fixtures or the radiant flux of the light emitted from the light fixtures. Such systems require additional hardware (i.e., the spectrometer or radiometer) to evaluate the light emitted from the light fixtures and, for example, the light used to illuminate an object.

Although the spectral content and radiant flux of light emitted from a light fixture is not relevant to a variety of lighting applications, some applications depend upon precise evaluation and determination of light used to illuminate objects. For example, spectral content and radiant flux of light can have a significant effect on photobiological phenomena (e.g., photosynthesis) in plants (e.g., in a horticultural lighting application). Optimal biological function may only result, for example, when all necessary component colors are present simultaneously. Also, an amount of delivered radiant flux per unit time (e.g., per day) can similarly affect photobiological phenomena. It would be beneficial to provide a lighting system or an operator of the lighting system with a technological solution for indicating the operational parameters of a light fixture without requiring additional hardware, such as a spectrometer or a radiometer.

Systems, devices, and methods are described herein for determining and displaying operational parameters of a light fixture that includes narrow band emitters. A controller includes stored information related to spectral power distributions of each of a plurality light wavebands that can be produced by the light fixture. Each waveband is generated by a plurality of narrow band emitters (e.g., light-emitting diodes ["LEDs"]). Based on the spectral power distributions, the controller is configured to determine an output spectrum of the light fixture and/or an output spectrum of individual wavebands. The controller is also configured to receive or determine additional information related to the light fixture or an object being illuminated by the light fixture. For example, the controller is configured to determine or receive (e.g., from a user input, from memory, etc.) a distance of an illuminated object from the light fixture. The controller is also configured to determine (e.g., calculate) a light flux density for the light used to illuminate the object (e.g., based on the distance), light flux delivered per unit time (e.g., per day), etc.

The controller is then configured to generate an output display that includes the determined operational parameters associated with the light fixture. In some embodiments, the controller is configured to include a mechanism in the output display for manipulating the outputs of the light fixture's wavebands (e.g., by providing one or more user manipulable input control devices). Using the one or more input control devices, a user can manipulate the operational parameters of the light fixture and observe, from the output display, a substantially real-time representation of the operational parameters of the light fixture based on the user manipulations.

Light fixtures described herein produce a light output. The light fixtures include a light source, a driver circuit, and a controller. The light source is configured to generate a waveband of light. The driver circuit is configured to drive the light source. The controller includes a non-transitory computer readable medium and processing unit. The controller includes computer executable instructions stored in the computer readable medium for controlling the light fixture to determine an output spectrum of the light fixture based on a spectral power distribution of the waveband of light, generate an output display that includes the output spectrum of the light fixture and an input mechanism configured to manipulate the light output, manipulate the light output based on the input mechanism, and update the output display to show changes to the light output.

Systems described herein provide for displaying and controlling characteristics of a light fixture that includes narrow band emitters. The system includes a light fixture and a controller. The light fixture is configured to produce a light output. The light fixture includes a light source configured to generate a waveband of light, and a driver circuit configured to drive the light source. The controller includes a non-transitory computer readable medium and processing unit. The controller includes computer executable instructions stored in the computer readable medium for controlling the system to determine an output spectrum of the light fixture based on a spectral power distribution of the waveband of light, generate an output display that includes the output spectrum of the light fixture and an input mechanism configured to manipulate the light output, manipulate the light output based on the input mechanism, and update the output display to show changes to the light output.

Devices described herein provide non-transitory computer readable media having stored thereon a program for displaying and controlling characteristics of a light fixture that includes narrow band emitters. The program is executable by a controller such that the controller is configured to determine an output spectrum of the light fixture based on a spectral power distribution of a waveband of light, generate an output display that includes the output spectrum of the light fixture and an input mechanism configured to manipulate a light output of the fixture, manipulate the light output based on the input mechanism, and update the output display to show changes to the light output.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

DETAILED DESCRIPTION

Figure 1:
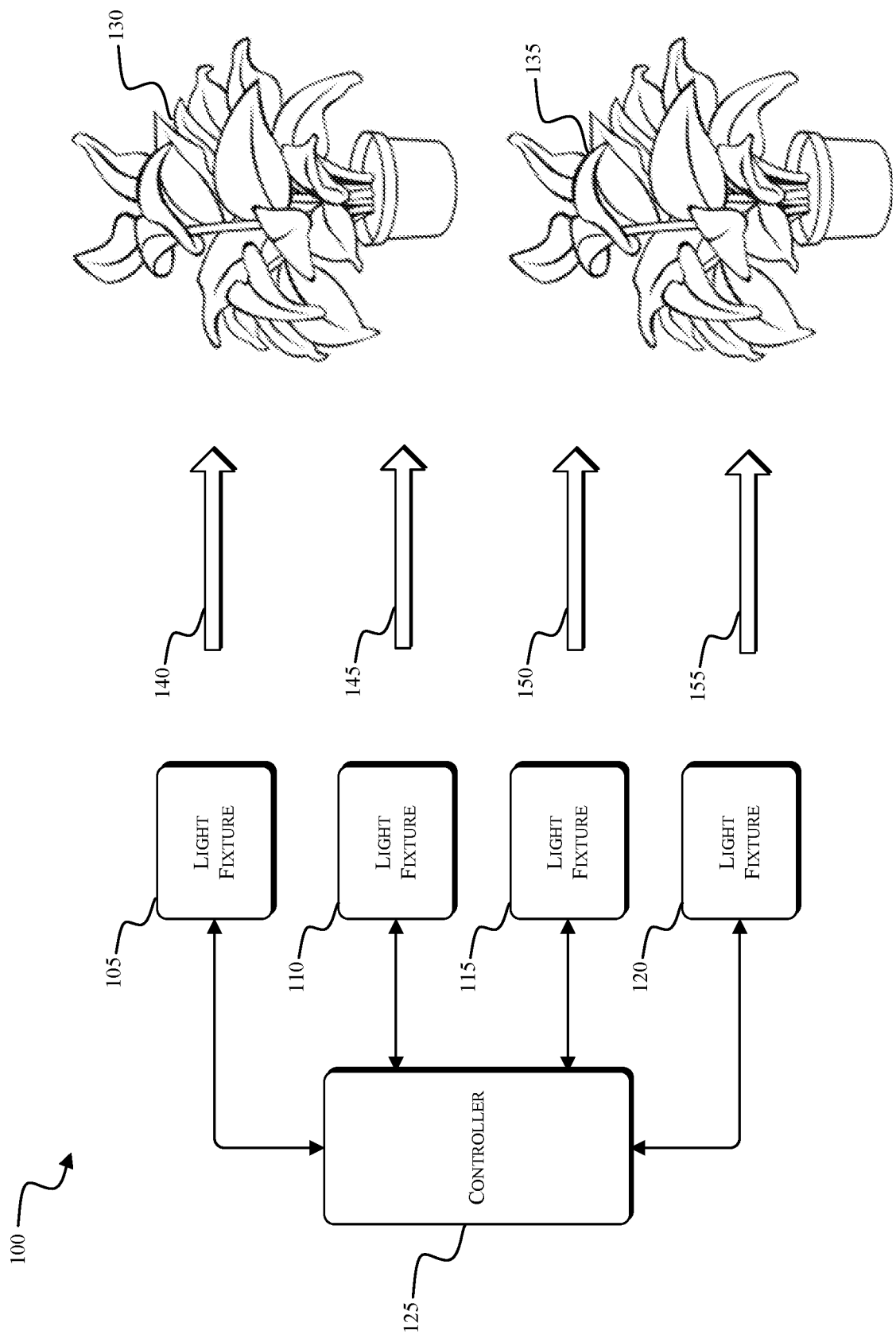
FIG. 1 first illustrates a lighting system.

FIG. 1 illustrates a first lighting system 100 that includes four light fixtures 105, 110, 115, and 120. Each of the fixtures 105-120 is connected to a controller 125 in a wired or wireless manner for receiving control signals that control respective light outputs 140, 145, 150, and 155 of the fixtures 105-120 that are used to illuminate plants 130, 135.

Figure 2:
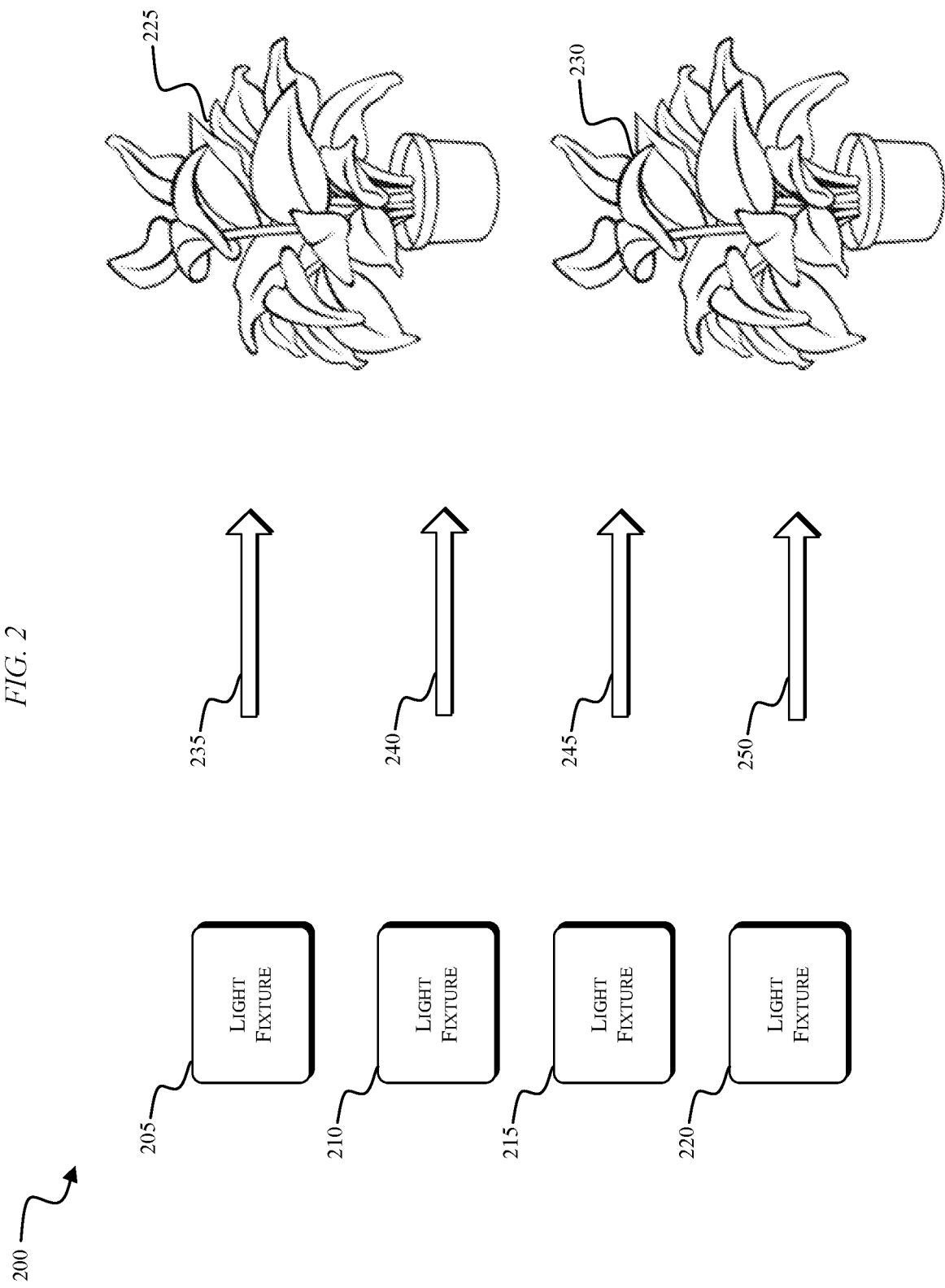
FIG. 2 second illustrates a lighting system.

FIG. 2 illustrates a second lighting system 200 that includes four light fixtures 205, 210, 215, and 220. Each of the fixtures 205-220 includes its own internal controller for controlling respective light outputs 235, 240, 245, and 250 of the fixtures 205-220 that are used to illuminate plants 225, 230. The controllers internal to each of the fixtures 205-220 operate in a similar manner to the controller 125 in FIG. 1. An exemplary controller for the system 100 or fixtures 205-220 is described with respect to FIG. 3.

Figure 3:
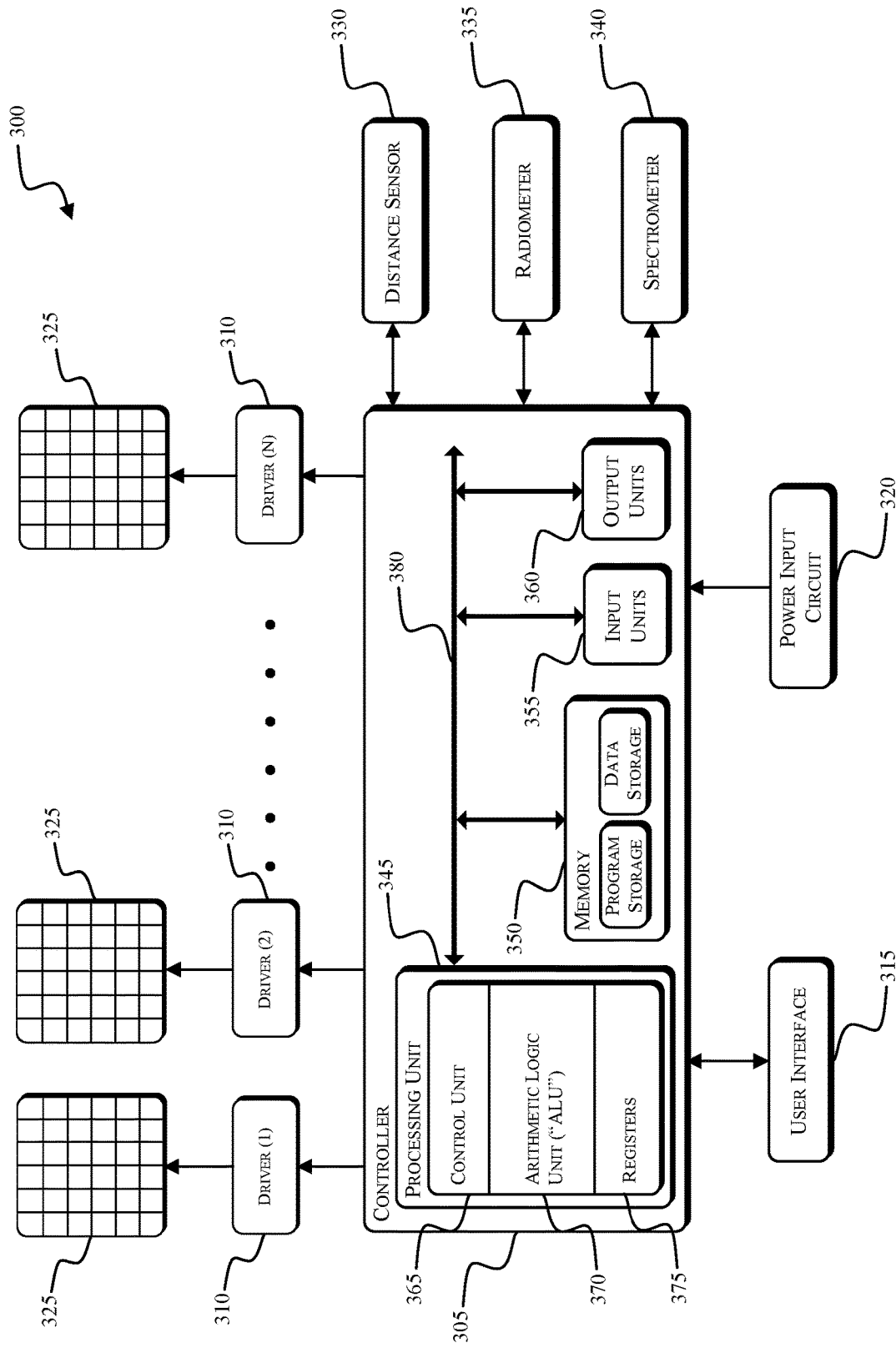
FIG. 3 illustrates a control system for determining, displaying, and controlling operational parameters of a light fixture including narrow band emitters.

FIG. 3 illustrates a system 300 for controlling the outputs of a plurality of light sources (e.g., light sources corresponding to different wavebands of light). A controller 305 for the system 300 is electrically and/or communicatively connected to a variety of modules or components of the system 300. The controller 305 can correspond to, for example, the controller 125 of FIG. 1 or the internal controllers of the fixtures 205-220. For illustrative purposes, the controller 305 is shown as providing drive signals independently and discretely to a plurality of drivers 310 (e.g., driver [1] to driver [N]) in a light fixture. The controller 305 is also connected to a user interface 315 and a power input circuit 320. The drivers 310 are each individually connected to an array of light sources 325 (e.g., LEDs) corresponding to a waveband of light (e.g., within a variance range of +/−10 nanometers of central emitter wavelength). In some embodiments, each array of light sources 325 is configured to generate a narrow band light output corresponding to different wavelengths of light. For example, a first array of light sources can produce light corresponding to infrared light (e.g., wavelengths in the range of approximately 800 nanometers to 1 micrometer). A final array of light sources can produce light corresponding to ultraviolet light (e.g., wavelengths in the range of approximately 200 nanometers to 400 nanometers). In some embodiments, the system 300 includes at least ten arrays of light sources 325 (e.g., between 10 and 35 arrays of light sources 325). In other embodiments, the system 300 includes fewer than ten arrays of light sources 325. The arrays of light sources 325 can, for example, be spectrally evenly spaced with respect to one another (e.g., consistent wavelength gaps between arrays along the electromagnetic spectrum) or the arrays of light sources 325 can be spectrally unevenly spaced such that some arrays are closer to spectrally adjacent arrays than others.

In some embodiments, the controller 305 is also connected to additional hardware, such as a distance sensor 330, a radiometer 335, a spectrometer 340, etc. The distance sensor (e.g., an infrared distance sensor, an ultrasonic sensor, a laser rangefinder, etc.) is configured to measure a distance between the distance sensor 330 and an object (e.g., an object being illuminated by the system 300). The radiometer 335 is configure to measure a radiant flux of a light output of the system 300. The spectrometer 340 is configured to measure a spectral content of a light output of the system 300. Although the distance sensor 330, radiometer 335, and spectrometer 340 are illustrated within the system 300, none of the distance sensor 330, radiometer 335, or spectrometer 340 is required to be included in the system 300. Each of the distance sensor 330, radiometer 335, and spectrometer 340 can optionally be included in the system 300 to expand the capabilities of the system 300 and controller 305.

The controller 305 includes combinations of hardware and software that are operable to, among other things, control the operation of the system 300, control the output of the arrays of light sources 325 (e.g., controlling output intensities of the light sources 325), generate an output display related to operational parameters or characteristics of the system 300, etc. The controller 305 includes a plurality of electrical and electronic components that provide power, operational control, and protection to the components and modules within the controller 305 and/or the system 300. For example, the controller 305 includes, among other things, a processing unit 345 (e.g., a microprocessor, a microcontroller, or another suitable programmable device), a memory 350, input units 355, and output units 360. The processing unit 345 includes, among other things, a control unit 365, an arithmetic logic unit ("ALU") 370, and a plurality of registers 375 (shown as a group of registers in FIG. 3), and is implemented using a known computer architecture (e.g., a modified Harvard architecture, a von Neumann architecture, etc.). The processing unit 345, the memory 350, the input units 355, and the output units 360, as well as the various modules connected to the controller 305 are connected by one or more control and/or data buses (e.g., common bus 380). The control and/or data buses are shown generally in FIG. 3 for illustrative purposes.

The memory 350 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 345 is connected to the memory 350 and executes software instructions that are capable of being stored in a RAM of the memory 350 (e.g., during execution), a ROM of the memory 350 (e.g., on a generally permanent basis), or another non-transitory computer readable medium such as another memory or a disc. Software included in the implementation of the system 300 can be stored in the memory 350 of the controller 305. The software includes, for example, firmware, one or more applications, program data, filters, rules, one or more program modules, and other executable instructions. The controller 305 is configured to retrieve from the memory 350 and execute, among other things, instructions related to the control processes and methods described herein. In other embodiments, the controller 305 includes additional, fewer, or different components.

The memory 350 also includes stored information related to spectral power distributions of each of the arrays of light sources 325 (e.g., the LEDs corresponding to each waveband) that can be produced by the system 300. Based on the spectral power distributions for each of the arrays of light sources 325, the controller 305 is configured to determine an output spectrum of the system 300 (e.g., including a plurality of wavebands) or an output spectrum for an individual waveband. In some embodiments, a generic model of the spectral power distributions of wavebands can be used (i.e., rather than specific spectral power distributions of the wavebands) so the user interface 315 can be implemented with a wide variety of generic light fixtures from different manufacturers.

The user interface 315 is included to provide user input to the system 300 and controller 305. The user interface 315 is operably coupled to the controller 305 to control, for example, the output of the arrays of light sources 325, etc. The user interface 315 can include any combination of digital and analog input devices required to achieve a desired level of control for the system 300. For example, the user interface 315 can include a computer having a display and input devices, a touch-screen display, and a plurality of knobs, dials, switches, buttons, faders, or the like. An illustrative example of the user interface 315 is illustrated and described with respect to FIG. 4.

The power input circuit 320 supplies a nominal AC or DC voltage to the system 300 and components within the system 300. The power input circuit 320 can be powered by mains power having nominal line voltages between, for example, 100V and 240V AC and frequencies of approximately 50-60 Hz. The power input circuit 320 is also configured to supply lower voltages to operate circuits and components within the system 300 (e.g., controller 305). Additionally or alternatively, the system 300 can receive power from one or more batteries or battery packs.

Figure 4:
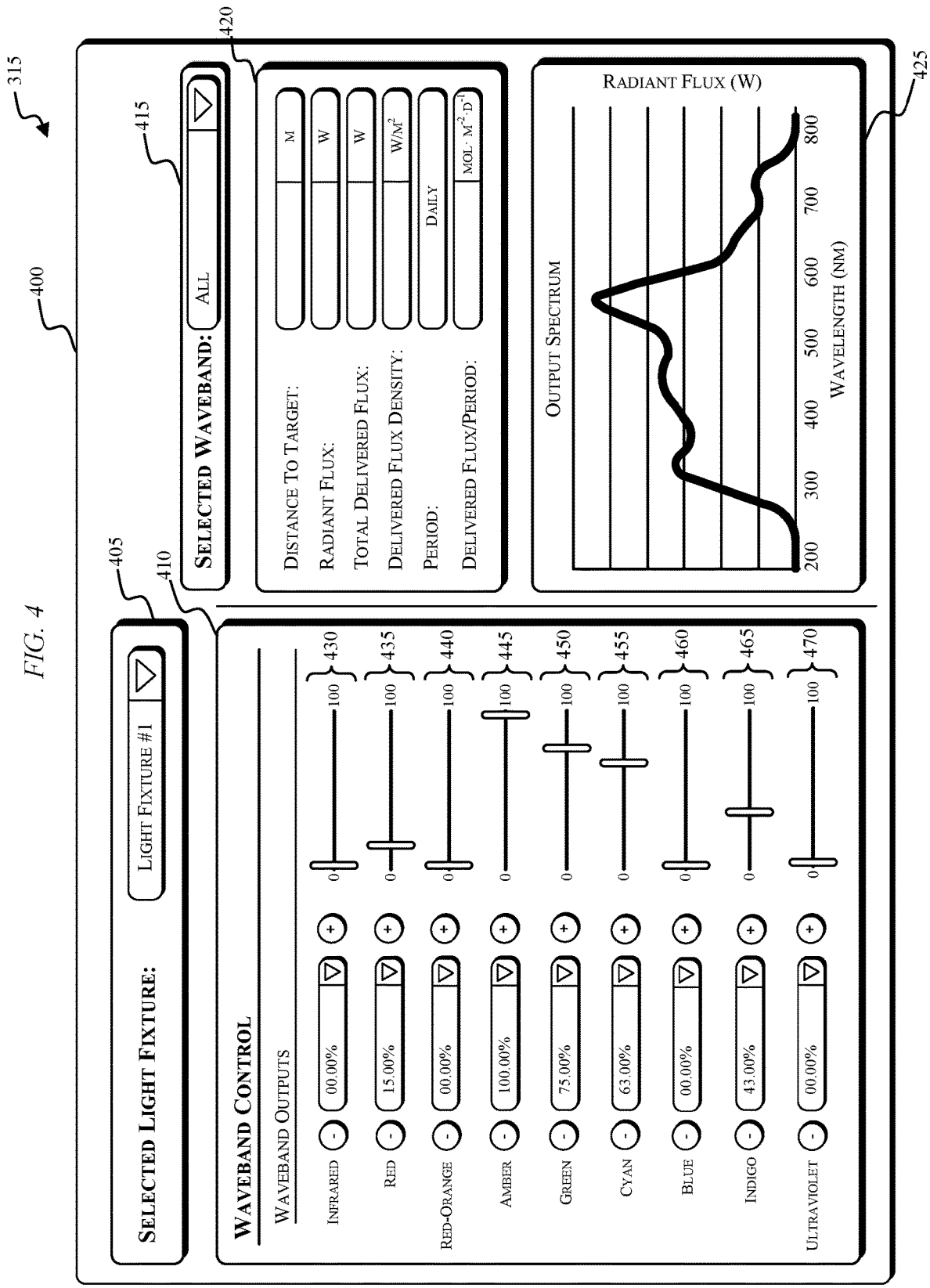
FIG. 4 illustrates an improved display for displaying and controlling operational parameters of a light fixture that includes narrow band emitters.

FIG. 4 illustrates the user interface 315. The user interface 315 includes an output display 400 (e.g., a graphical user interface ["GUI"]). The output display 400 includes a light fixture selection input mechanism 405, a waveband control input mechanism 410, a waveband select input mechanism 415, an operational parameters output portion 420, and an output spectrum portion 425. The output display 400 is a more efficient technique for displaying operational parameters of a light fixture because it combines several operational parameters and capabilities that are important to, for example, horticultural lighting applications. For example, in addition to operational parameters of a light fixture (e.g., radiant flux, output spectrum), the output display 400 includes the ability for a user to manipulate those parameters from the output display 400 (e.g., using waveband control input mechanism 410). The output display 400 also, in addition to the control of a light fixture and display of general operational parameters of the light fixture, incorporates operational parameters of the light fixture that relate specifically to an object being illuminated by the light fixture (e.g., delivered flux density, delivered flux per time period [e.g., Daily Lighting Integral ("DLI")]) as described below. The integration of these operational parameters of a light fixture along with the substantially real-time control of the operational parameters provides a more efficient and practical implementation of an interface for applications such as horticultural lighting (e.g., where the effects of light used to illuminate an object [e.g., a plant] can be significant).

The light fixture selection input mechanism 405 enables a user to select a light fixture (e.g., light fixture 105) among a plurality of light fixtures (e.g., light fixtures 105, 110, 115, and 120). In embodiments where only a single light fixture is present, a user is only able to select the available light fixture. After a light fixture is selected, the operational parameters of the selected light fixture can be viewed in the output display 400 and/or manipulated by a user.

The waveband control input mechanism 410 includes a plurality of input control devices 430, 435, 440, 445, 450, 455, 460, 465, and 470 for individually controlling an output of each of a plurality of wavebands included in the light fixture. In some embodiments, additional wavebands and input control devices are provided. In other embodiments, fewer wavebands and input control devices are provided. In the illustrated embodiment, each of the input control devices 430-470 includes an increment button, a decrement button, a dropdown menu, and a fader. In some embodiments, a user populates a value for a light source output by entering text via a mechanical or virtual keyboard of a computer or similar processing device, and using a pointing or selection device such as a mouse to control a cursor on the display to select an input control device. Input signals from the keyboard and the mouse are received, processed, and translated by the controller 305 into a visual result or action in the output display 400. For example, if the user enters text using a keyboard, the activated keys produce signals which are represented as type-written text in the output display 400. Similarly, a mouse click, which corresponds to a location of a cursor on the screen, results in selecting/deselecting an increment button, a decrement button, a dropdown menu, or a position of a fader. In other embodiments, the output display 400 is accessed and controlled using a touch-screen device and a user's finger strokes or tapping are used to populate or modify the input control devices 430-470.

The waveband select input mechanism 415 enables a user to select a particular waveband of light produced by the light fixture or a combination of wavebands (e.g., all of the wavebands). Based on the selected waveband or wavebands using the waveband select input mechanism 415, the operational parameters output portion 420 and the output spectrum portion 425 can correspondingly be controlled by the controller 305. For example, in the illustrated embodiment, the operational parameters output portion 420 includes an output portion for a distance to a target, radiant flux, total delivered flux (e.g., to the target), delivered flux density (e.g., based on the distance to target), selected time period, and delivered flux per time period (e.g., DLI). The controller 305 is configured to determine a delivered flux per time period by, for example, integrating delivered flux density over a time period (e.g., based on a growing cycle timer when a target object is being illuminated). The controller 305 can aggregate or accumulate the integrated delivered flux densities to determine, for example, the DLI. In some embodiments, the distance to target can be input to the operational parameters output portion 420 by a user or populated by the controller 305 based on a signal received from the distance sensor 330. In other embodiments, the distance to target is retrieved by the controller 305 from the memory 350. In some embodiments the radiometer 335 and/or spectrometer 340 can also be used to measure parameters of the system 300 for display in the output display 400.

The output spectrum portion 425 includes a visual representation of an output spectrum (e.g., wavelength versus radiant flux or power) of the light fixture (e.g., all wavebands combined into a single output) or an individually selected waveband (e.g., selected using the waveband select input mechanism 415). The output spectrum portion 425 can be updated by the controller 305 in substantially real-time based on user manipulations of the light fixture selection input mechanism 405, the waveband control input mechanism 410 (i.e., any one or more of input control devices 430-470), and the waveband select input mechanism 415.

Thus, embodiments described herein provide, among other things, systems, devices, and methods for determining and displaying operational parameters of a light fixture that includes narrow band emitters.

What is being claimed is:

1. A light fixture configured to produce a light output, the light fixture comprising:
    a light source configured to generate a waveband of light;
    a driver circuit configured to drive the light source; and
    a controller including a non-transitory computer readable medium and processing unit, the controller including computer executable instructions stored in the computer readable medium for controlling the light fixture to:
        determine an output spectrum of the light fixture based on a spectral power distribution of the waveband of light,
        generate an output display that represents a combined output spectrum of a generic light fixture, the output display illustrating multiple spectrums of the light output of the light fixture combined into a single output,
        receive inputs from an input mechanism configured to manipulate the light output,
        manipulate the light output based on the input mechanism, and
        update the output display to show changes to the combined output spectrum of the light output based on the received inputs, wherein the combined output spectrum corresponds to an output spectrum implementable on the generic light fixture.

2. The light fixture of claim 1, wherein the light source includes a light emitting diode.

3. The light fixture of claim 1, further comprising:
    a plurality of light sources,
    wherein the plurality of light sources is configured to generate different wavebands of light.

4. The light fixture of claim 1, wherein:
    the output display includes operational parameters of the light fixture; and
    the input mechanism is configured to manipulate the operational parameters of the light fixture.

5. The light fixture of claim 4, wherein:
    the input mechanism is one selected from the group consisting of: a light fixture selection input mechanism, a waveband control input mechanism, and a waveband select input mechanism.

6. The light fixture of claim 5, wherein:
    the waveband select input mechanism enables a user to select the waveband of light or a plurality of wavebands of light.

7. The light fixture of claim 6, wherein:
    the operational parameters in the output display are updated based on the selected waveband of light.

8. The light fixture of claim 7, wherein:
    the operational parameters include a delivered flux density per a time period; and
    the delivered flux density per the time period is calculated by integrating delivered flux density over the time period.

9. A system for displaying and controlling characteristics of a light fixture that includes narrow band emitters, the system comprising:
    the light fixture configured to produce a light output, the light fixture including:
        a light source configured to generate a waveband of light, and
        a driver circuit configured to drive the light source; and
    a controller including a non-transitory computer readable medium and processing unit, the controller including computer executable instructions stored in the computer readable medium for controlling the system to:
        determine an output spectrum of the light fixture based on a spectral power distribution of the waveband of light,
        generate an output display that represents a combined output spectrum of a generic light fixture, the output display illustrating multiple spectrums of the light output of the light fixture combined into a single output,
        receive inputs from an input mechanism configured to manipulate the light output,
        manipulate the light output based on the input mechanism, and
        update the output display to show changes to the combined output spectrum of the light output based on the received inputs, wherein the combined output spectrum corresponds to an output spectrum implementable on the generic light fixture.

10. The system of claim 9, wherein the light source includes a light emitting diode.

11. The system of claim 9, further comprising:
    a plurality of light sources,
    wherein the plurality of light sources is configured to generate different wavebands of light.

12. The system of claim 9, wherein:
    the output display includes operational parameters of the light fixture; and
    the input mechanism is configured to manipulate the operational parameters of the light fixture.

13. The system of claim 12, wherein:
    the input mechanism is one selected from the group consisting of: a light fixture selection input mechanism, a waveband control input mechanism, and a waveband select input mechanism.

14. The system of claim 13, wherein:
    the waveband select input mechanism enables a user to select the waveband of light or a plurality of wavebands of light.

15. The system of claim 14, wherein:
the operational parameters in the output display are updated based on the selected waveband of light.

16. The system of claim 15, wherein:
the operational parameters include a delivered flux density per a time period; and
the delivered flux density per the time period is calculated by integrating delivered flux density over the time period.

17. The system of claim 9, further comprising:
a second light fixture configured to produce a second light output, the second light fixture including:
  a second light source configured to generate a second waveband of light, and
  a second driver circuit configured to drive the second light source.

18. The system of claim 17, wherein:
the controller is further configured to:
  determine a second output spectrum of the second light fixture based on a second spectral power distribution of the second waveband of light,
  generate the output display that includes the second output spectrum of the second light fixture and the input mechanism configured to manipulate the second light output,
  manipulate second the light output based on the input mechanism, and
  update the output display to show changes to the second light output.

19. A non-transitory computer readable medium having stored thereon a program for displaying and controlling characteristics of a light fixture that includes narrow band emitters, the program being executable by a controller such that the controller is configured to:
  determine a combined output spectrum of the light fixture based on a spectral power distribution of a waveband of light;
  generate an output display that includes the combined output spectrum of a generic light fixture, the output display illustrating multiple spectrums of the light output of the light fixture combined into a single output,
  receive inputs from an input mechanism configured to manipulate a light output of the fixture;
  manipulate the light output based on the input mechanism; and
  update the output display to show changes to the combined output spectrum of the light output based on the received inputs, wherein the combined output spectrum corresponds to an output spectrum implementable on the generic light fixture.

20. The non-transitory computer readable medium of claim 19, wherein:
the output display includes operational parameters of the light fixture;
the operational parameters include a delivered flux density per a time period; and
the delivered flux density per the time period is calculated by integrating delivered flux density over the time period.

* * * * *